United States Patent
Fernald et al.

(10) Patent No.: US 9,886,412 B2
(45) Date of Patent: Feb. 6, 2018

(54) COMMUNICATION APPARATUS HAVING AN OSCILLATOR THAT IS DISABLED BASED ON IDLE STATE DETECTION OF A COMMUNICATION LINK AND ASSOCIATED METHODS

(71) Applicant: Silicon Laboratories Inc., Austin, TX (US)

(72) Inventors: Kenneth W. Fernald, Austin, TX (US); Phillip Matthews, Austin, TX (US); Thomas Saroshan David, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 358 days.

(21) Appl. No.: 14/224,057

(22) Filed: Mar. 24, 2014

(65) Prior Publication Data
US 2015/0269106 A1    Sep. 24, 2015

(51) Int. Cl.
*G06F 13/00* (2006.01)
*G06F 13/42* (2006.01)
*G06F 13/38* (2006.01)
*G06F 11/30* (2006.01)
*G06F 1/32* (2006.01)

(52) U.S. Cl.
CPC ........ *G06F 13/423* (2013.01); *G06F 11/3048* (2013.01); *G06F 13/385* (2013.01); *G06F 1/3203* (2013.01); *G06F 11/30* (2013.01); *Y02B 60/1228* (2013.01); *Y02B 60/1235* (2013.01)

(58) Field of Classification Search
CPC ....... G06F 11/30; G06F 1/3203; G06F 13/423
USPC ..... 710/14, 18, 305, 306; 327/148; 713/300, 713/340
See application file for complete search history.

(56) References Cited

U.S. PATENT DOCUMENTS

| | | | |
|---|---|---|---|
| 6,085,325 A | 7/2000 | Jackson | |
| 6,467,042 B1 * | 10/2002 | Wright | G06F 1/3203 713/320 |
| 6,917,658 B2 | 7/2005 | Fernald | |
| 7,197,578 B1 * | 3/2007 | Jacobs | G06F 1/3203 710/14 |
| 7,395,447 B2 | 7/2008 | Prihadi et al. | |
| 7,616,074 B2 * | 11/2009 | Toffolon | H03L 3/00 331/158 |
| 7,873,858 B2 * | 1/2011 | Sung | G06F 1/04 713/500 |

(Continued)

OTHER PUBLICATIONS

U.S. Appl. No. 14/224,048, filed Mar. 24, 2014, Fernald et al.

(Continued)

*Primary Examiner* — Tammara Peyton
(74) *Attorney, Agent, or Firm* — Law Offices of Maximilian R. Peterson

(57) ABSTRACT

A system for communicating information includes one device that communicates information via a communication link. The system also includes a second device to communicate information via the communication link. The second device includes a receiver to receive information from the communication link. The second device also includes an oscillator that provides at least one timing signal to the receiver. The oscillator is disabled when the communication link is in an idle state. The oscillator is enabled when the communication link is in a non-idle state.

20 Claims, 9 Drawing Sheets

(56) References Cited

U.S. PATENT DOCUMENTS

| | | | |
|---|---|---|---|
| 8,003,911 B2 | 8/2011 | Onodera et al. | |
| 8,036,613 B2* | 10/2011 | Schneckenburger | G06F 13/4295 455/146 |
| 8,378,724 B2* | 2/2013 | David | H03L 7/146 327/148 |
| 8,654,112 B2 | 2/2014 | Hsu | |
| 8,707,068 B2 | 4/2014 | Saladin et al. | |
| 2005/0066077 A1* | 3/2005 | Shibata | G06F 1/3203 710/33 |
| 2006/0043202 A1* | 3/2006 | Kim | G06K 19/0723 235/492 |
| 2008/0079465 A1* | 4/2008 | Sung | G06F 1/04 327/101 |
| 2012/0002764 A1* | 1/2012 | Hsiao | H03L 7/085 375/344 |
| 2013/0212408 A1 | 8/2013 | Fernald | |
| 2014/0082392 A1* | 3/2014 | Nishizawa | G06F 1/3234 713/323 |

OTHER PUBLICATIONS

U.S. Appl. No. 14/869,926, filed Sep. 29, 2015, Fernald et al.
*Wake-on-LAN*, Wikipedia article, retrieved Mar. 25, 2016, 10 pgs.
Bosch, *Tutorial for Wake Up Schemes and Requirement for Automotive Communication Networks*, Jun. 24, 2012, 16 pgs.
Office communication in U.S. Appl. No. 14/869,926, dated Jul. 1, 2016, 9 pgs.
Office communication in U.S. Appl. No. 14/224,048, dated Aug. 21, 2015, 8 pgs.
Office communication in U.S. Appl. No. 14/224,048, dated Oct. 4, 2016, 8 pgs.
Office communication in U.S. Appl. No. 14/869,926, dated Jan. 13, 2017, 12 pgs.

\* cited by examiner

COMMUNICATION APPARATUS HAVING AN OSCILLATOR THAT IS DISABLED BASED ON IDLE STATE DETECTION OF A COMMUNICATION LINK AND ASSOCIATED METHODS

CROSS-REFERENCE TO RELATED APPLICATIONS

This patent application relates to concurrently filed U.S. patent application titled "Low-Power Communication Apparatus and Associated Methods," Ser. No. 14/224,048.

TECHNICAL FIELD

The disclosure relates generally to communication apparatus and methods and, more particularly, to apparatus for improved-performance communication apparatus, such as universal serial bus (USB) communication apparatus, and associated methods.

BACKGROUND

Typical information or data processing systems or electronic systems include various subsystems or modules. The subsystems or modules may provide various functionality. The modular nature of the system (e.g., using subsystems) affords system designers more flexibility in designing and producing the system.

By their nature, systems typically include apparatus for two or more of the subsystems or modules to communicate together. The communication may occur over buses. One example of such a bus constitutes USB, a ubiquitous serial bus that provides communication between various modules, subsystems, or circuitry in electronic systems, such as data-processing systems, computers, etc.

Since the introduction of USB, a variety of refinements and improvements have been made. An example constitutes U.S. Pat. No. 6,917,658, which discloses a clock recovery method that allows a USB device to operate using an internal oscillator rather than a crystal oscillator (or an internal oscillator frequency locked to a crystal clock).

SUMMARY

In exemplary embodiments, a variety of communication apparatus with improved performance and associated methods are contemplated. According to one exemplary embodiment, a system for communicating information includes one device that communicates information via a communication link. The system also includes a second device to communicate information via the communication link. The second device includes a receiver to receive information from the communication link, and a controller to process the received information. The second device also includes an oscillator that provides at least one timing signal to the controller. The oscillator is disabled when the communication link is in an idle state.

According to another exemplary embodiment, a communication system includes a universal serial bus (USB) host to communicate information via a USB bus, and a USB device to communicate information via the USB bus. The USB device includes: (a) a differential receiver to receive packets from the USB bus; (b) a USB controller to process the received packets, the USB controller coupled to receive a clock signal; and (c) an oscillator coupled to provide the clock signal to the USB controller, where the oscillator is disabled when the USB bus is in an idle state.

According to another exemplary embodiment, a method of operating a communication system includes using a first device to communicate information via a communication link to a second device; and receiving information from the communication link in the second device, and processing the information in response to a timing signal. The method further includes enabling an oscillator to provide the timing signal when the communication link is in a non-idle state.

BRIEF DESCRIPTION OF THE DRAWINGS

The appended drawings illustrate only exemplary embodiments and therefore should not be considered as limiting the scope of the application or the claims. Persons of ordinary skill in the art appreciate that the disclosed concepts lend themselves to other equally effective embodiments. In the drawings, the same numeral designators used in more than one drawing denote the same, similar, or equivalent functionality, components, or blocks.

DETAILED DESCRIPTION

The disclosed concepts relate generally to communication apparatus and methods, including apparatus for improved-performance communication apparatus, such as USB communication apparatus, and associated methods. More particularly, the disclosure relates to apparatus and methods for reducing power consumption of communication circuitry, such as a USB device.

Reduction of power consumption of communication circuitry may be accomplished by using one or both of the following techniques: (a) reducing power when the communication bus (e.g., a USB bus) is in an idle state; or (b) during periods when information is communicated via the bus (e.g., incoming traffic on a USB bus) that will not be accepted by the device or will be rejected by the device. For each of the above scenarios (idle bus and rejected traffic) the power savings includes two parts, as discussed below in detail.

Figure 1:
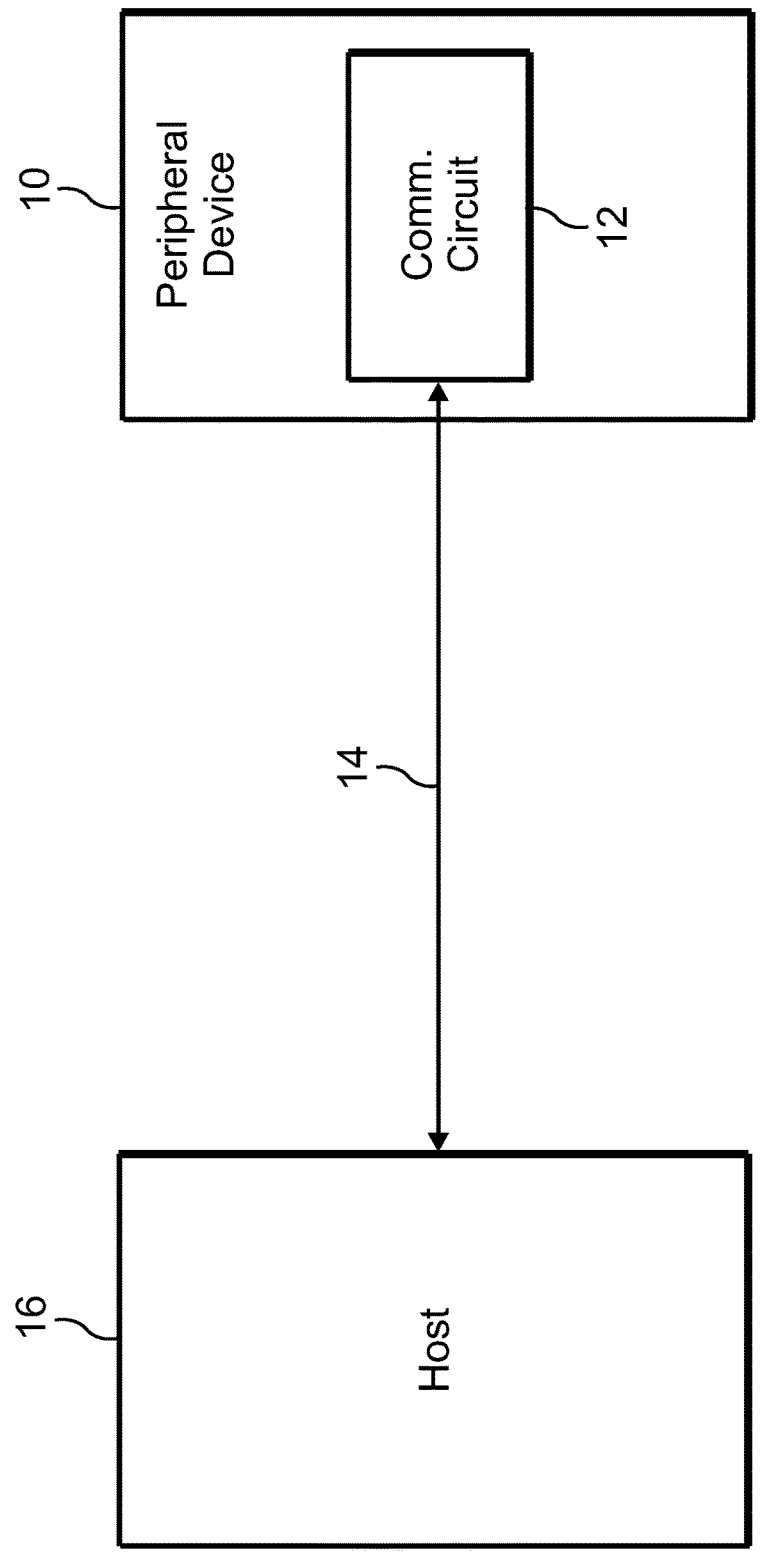
FIG. 1 illustrates a block diagram of a system whose power consumption may be reduced according to an exemplary embodiment.

The disclosed techniques for reducing power consumption may be used in a variety of apparatus or systems. FIG. 1 illustrates a system whose power consumption may be reduced according to an exemplary embodiment. The system in FIG. 1 includes a host 16 (or a source of information, generally) that communicates with a peripheral device 10 (or a destination for the information, generally) via communication link or bus 14.

Peripheral device 10 includes communication circuit 12, which couples to host 16 via link 14. Thus, communication circuit 12 provides a mechanism for host 16 and peripheral device 10 to communicate information. In some embodiments, communication circuit 12 may include a transceiver, which allows both the reception and transmission of information via link 14.

In exemplary embodiments, the information communication via communication link 14 may occur periodically. For example, in some embodiments, the information is communicated in bursts. As another example, in some embodiments, the information is communicated via packets.

Note that host 16 and peripheral device 10 may reside in the same physical package or enclosure, or they may reside in different physical packages or enclosures, communicating via link 14. Furthermore, note that either or both peripheral device 10 and host 16 may include a variety of subsystems or circuits, some of which facilitate communication of information via link 14. In particular, in the embodiment in FIG. 1, communication circuit 12 includes (not shown) circuitry for reducing power consumption of communication circuit 12 and, thus, of peripheral device 10.

Figure 2:
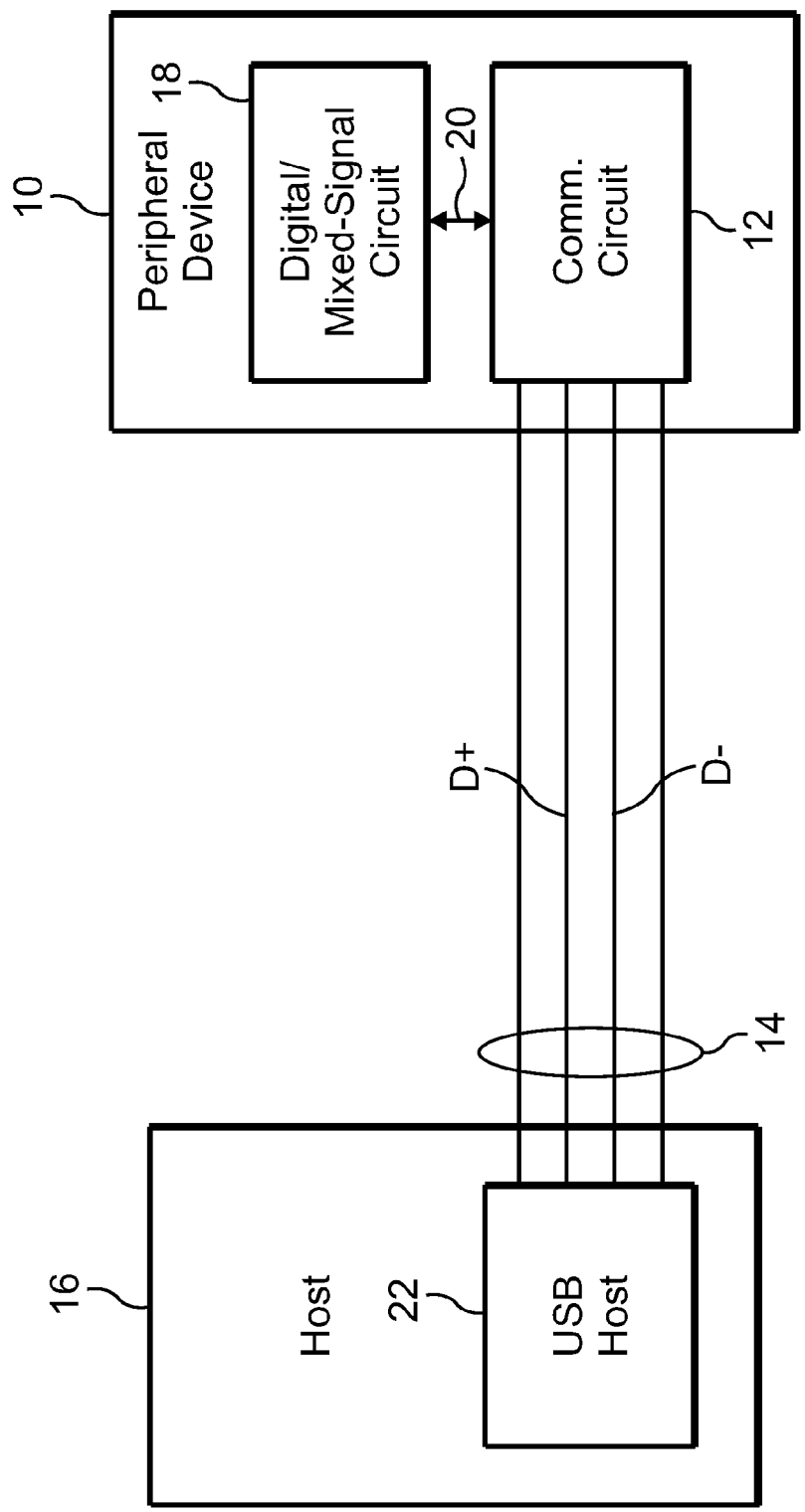
FIG. 2 depicts a block diagram of a system that communicates information using the USB protocol according to an exemplary embodiment.

In some embodiments, communication circuit 12 may be a USB device or include circuitry to provide USB communication with host 16. FIG. 2 depicts such a system according to an exemplary embodiment.

In the embodiment shown in FIG. 2, link 14 constitutes or includes a USB bus. Host 16 includes USB host 22, which communicates information to/from USB bus 14. As persons of ordinary skill in the art understand, USB bus 14 includes one conductor for power, and one conductor for ground or a reference voltage. USB bus 14 also includes two conductors for a differential signal, labeled in FIG. 2 as "D+" and "D−," respectively. The differential signal provides a means of communication between host 16 and peripheral device 10 according to USB protocols.

In peripheral device 10, communication circuit 12 can send and/or receive information according to USB protocols. In the embodiment shown, communication circuit 12 communicates with a digital/mixed-signal circuit 18 via link or bus 20. Through link or bus 20, communication circuit 12 may receive information from, or provide information to, digital/mixed-signal circuit 18.

In some embodiments, digital/mixed-signal circuit 18 may include digital circuitry, such as a processor, memory, etc. that interfaces with communication circuit 12. In some embodiments, digital/mixed-signal circuit 18 may include a microcontroller unit (MCU). Digital/mixed-signal circuit 18 (or the MCU) may include digital circuitry (e.g., memory, processing circuitry, arithmetic circuitry, logic circuitry, and the like).

Digital/mixed-signal circuit 18 (or the MCU) may further include analog or mixed-signal circuitry, such as analog-to-digital converters (ADCs), amplifiers, comparators, and the like. Note that in some embodiments, communication circuit 12 may be part of the MCU, for example, integrated on the same semiconductor die as the MCU, and/or included in the same package as the MCU (e.g., in a multi-chip module), as desired.

As described below in detail, one aspect of the disclosure concerns disabling an oscillator for communication circuit 12 during periods when the device is idle or waiting for incoming information, such as USB traffic, packets, etc., and re-enable the oscillator when incoming traffic or information is detected. Put another way, the oscillator is in a low-power state or disabled when the device is idle. The oscillator is in the normal or enabled mode of operation or state when incoming traffic, information, or packets are detected, e.g., the communication link is in a non-idle state.

In exemplary embodiments, an internal (to communication circuit 12 or to peripheral device 10) oscillator, such as a resistor-capacitor-based (RC-based) oscillator (not shown in FIGS. 1-2; described below in detail) is used. The oscillator may be disabled and enabled relatively quickly (compared, for example, to crystal-based oscillators). In other words, the oscillator can make transitions between the normal and low-power modes of operation or states relatively quickly.

As described below in detail, another aspect of the disclosure relates to disabling or placing in a low-power state parts of communication circuit 12 when waiting for communication to occur via link 14, for example, incoming USB packets or traffic (e.g., when the bus is idle). An example of circuitry that can be disabled or placed in a low-power mode or state is a receiver that receives communication, such as packets or bursts of information, from link 14. The receiver may be enabled or placed in a normal mode of operation or state when link 14 is in a non-idle state or when other events take place, as described below in detail.

Figure 3:
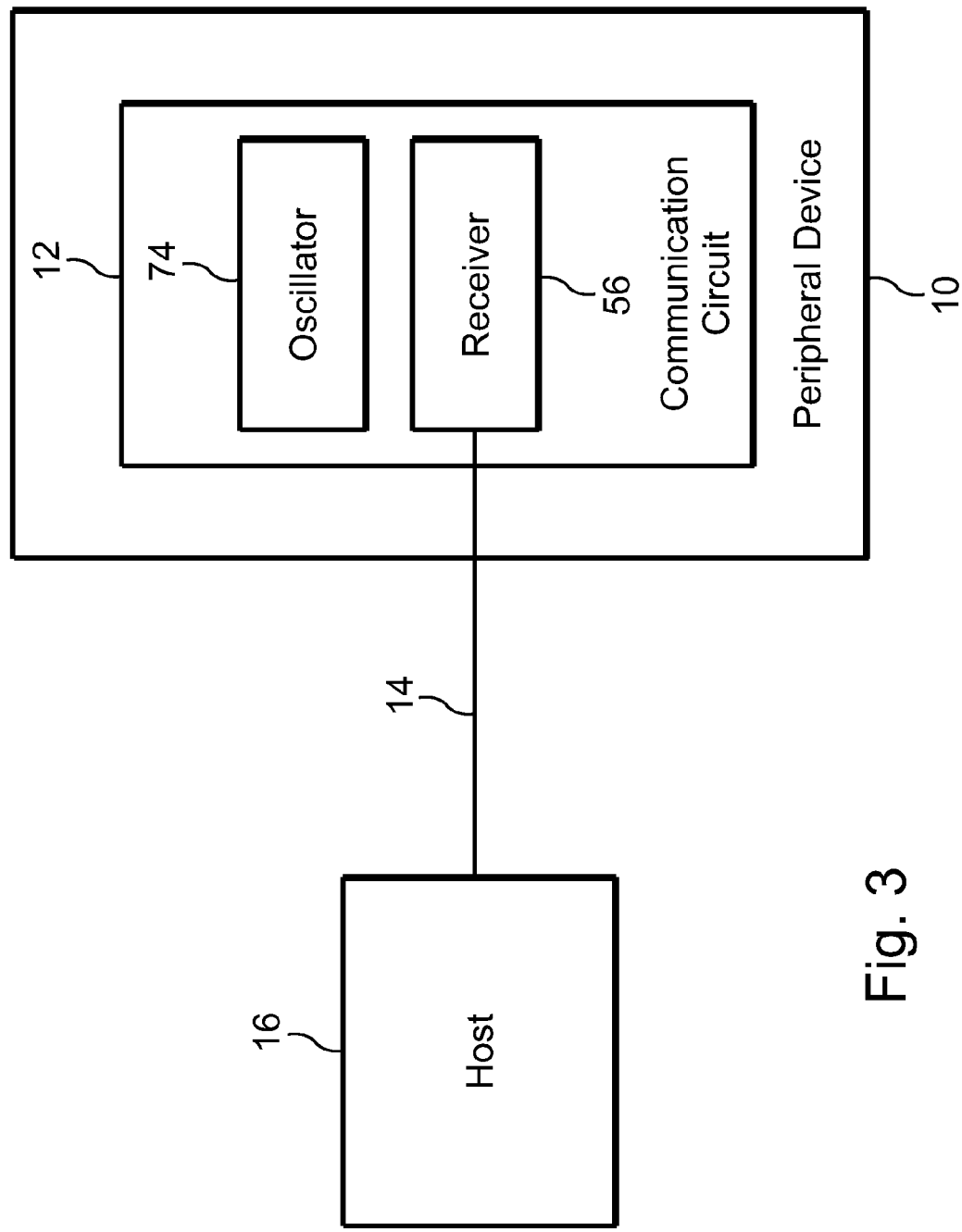
FIG. 3 shows a more detailed block diagram of a system whose power consumption may be reduced according to exemplary embodiments.

FIG. 3 shows a block diagram of another system whose power consumption may be reduced according to exemplary embodiments. Similar to FIGS. 1-2, the system in FIG. 3 includes host 16, which communicates with peripheral device 10 via link 14.

Also similar to FIGS. 1-2, communication circuit 12 couples to link 14 to receive information from link 14 and/or transmit information to link 14. Referring to FIG. 3, in the exemplary embodiment shown, communication circuit 12 includes oscillator 74. Oscillator 74 provides one or more timing signals, such as clock signal(s), to circuitry in communication circuit 12.

Oscillator 74, or parts of oscillator 74 (i.e., oscillator 74 may be partially or fully disabled), may be disabled or placed in a low-power mode of operation or state when peripheral device 10 or communication circuit 12 is idle or waiting for incoming information. Oscillator 74 is enabled or placed in a normal mode of operation or state when incoming traffic or information is detected. When oscillator 74 operates in the normal mode of operation or state (i.e., is enabled), it provides one or more timing signals to circuitry in communication circuit 12, as described above.

Similarly, receiver 56, or parts of receiver 56, may be disabled or placed in a low-power mode of operation or state (e.g., by inhibiting one or more of its bias currents) during certain periods of time, e.g., when peripheral device 10 or communication circuit 12 is idle or waiting for incoming information, during to-be-rejected packets, or during certain other conditions, such as a reset condition (in embodiments that communicate using USB signaling).

During other times, for example, when the above conditions do not exist or information exists that receiver 56 should receive (e.g., a valid packet in a USB signaling embodiment), receiver 56 may be enabled or placed in a normal mode of operation or state (e.g., by enabling its bias current(s)). Receiver 56 may thereafter receive information from link 14.

Referring to FIGS. 1-3, in some embodiments, all or part of the system may be battery powered, mobile, or portable. In some embodiments, all or part of the system may be powered by an alternative or renewable energy source, such as solar cells, or by a hybrid source, for example, a solar cell in combination with a battery. Given the relatively small amount of energy available in such applications, the apparatus and techniques for communication circuits with reduced power consumption provide advantages or benefits, for example, by extending the battery life, increasing the "up-time" (e.g., delaying the point in time when the system enters sleep, hibernation, or shutdown mode or state) or active time of the system, and the like.

Figure 4:
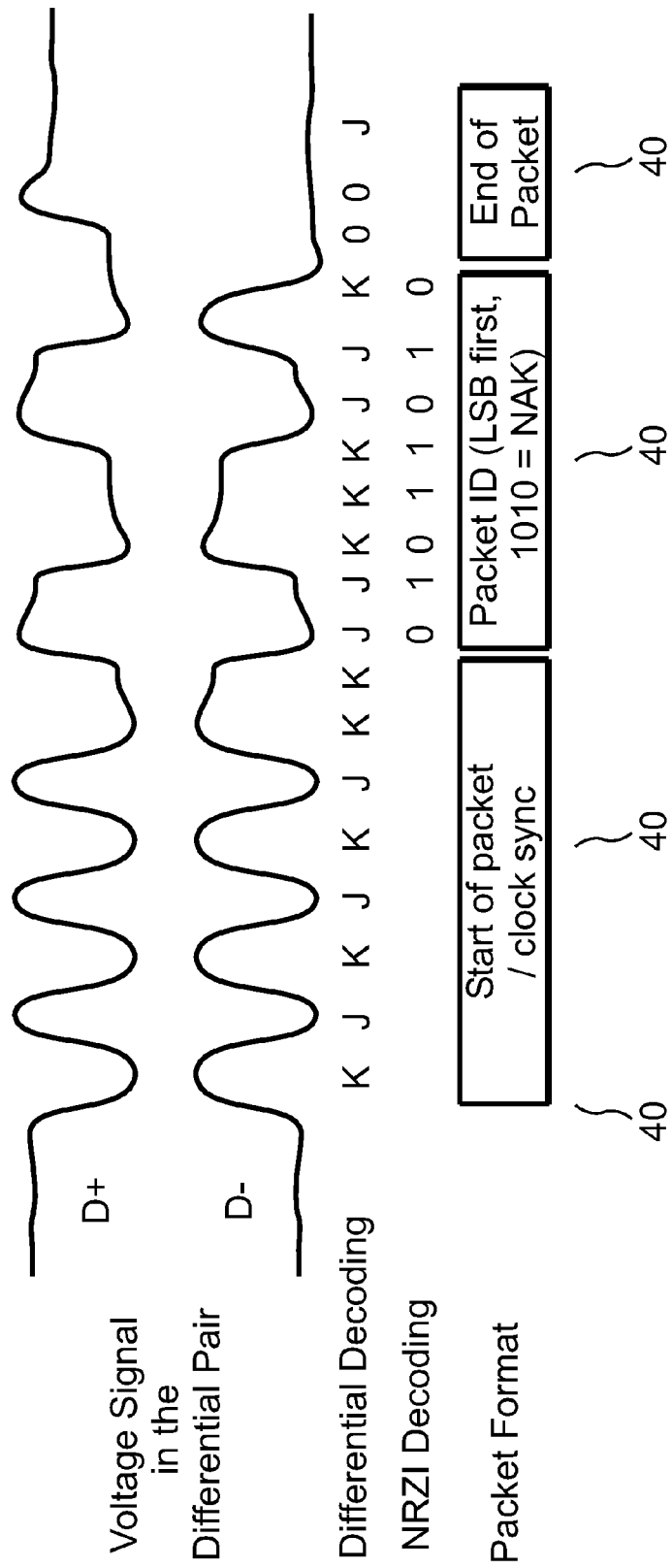
FIG. 4 depicts a diagram for USB communication in an exemplary embodiment.

As noted, in some embodiments, communication circuit 12 communicates with a USB bus (see, for example, FIGS. 2-3). Since USB packets start with a synchronization pattern, no data are lost as long as the oscillator is stable and the USB logic circuitry has aligned to the incoming bits of data before the end of this synchronization pattern. FIG. 4 shows a diagram of the start of a USB packet operating in full-speed mode (USB supports devices with various speed classes).

As FIG. 4 shows, the USB signals occupy two states, labeled as "J" and "K." When idle, the USB signals occupy the "J" state, e.g. signal D+ has a logic high value, and signal D− has a logic low value when in the full-speed mode. At the start of a packet, the synchronization pattern starts, causing the USB signals to leave the idle state. The "KJKJKJKK" sequence illustrated in FIG. 4 is the synchronization pattern for full-speed operation. Other details of operation of USB are known to persons of ordinary skill in the art, and are therefore not described here.

The synchronization pattern is followed by the packet payload, in this case including a packet identification (ID) indicating that the packet is a "NAK" packet. The synchronization pattern is used by the receiving USB controller (included in peripheral device 10, and described below in detail) to align its sampling of the incoming D+ and D-signals with the center of the received bits.

In FIG. 4, the ideal or preferred sample time is approximately the mid-point between the vertical lines labeled as "40." Since the synchronization pattern has no other purpose, the receiving USB controller need not correctly sample the start of the synchronization pattern, as long as by the end of the pattern the controller has successfully aligned its sampling time to avoid bit errors.

To do so, the local clock used by the receiving USB controller should be stable by approximately the half-way point or mid-point of the incoming synchronization pattern, thus allowing the controller to use the second half of the synchronization pattern to align its sample time.

A number of known methods for aligning the sample time with the synchronization pattern may be used. A person of ordinary skill in the art would understand, it may be desirable for the local clock may in some circumstances to be stable sooner or later than the approximate mid-point of the synchronization pattern, depending on the alignment method used.

Taking advantage of the property and sequence of events described above with respect to the synchronization pattern and sampling time, the oscillator that generates the local clock when the bus is idle may be disabled (fully or partially) for a period of time. The oscillator may then be enabled or re-enabled when the first "K" state of the synchronization pattern is detected. In general, the oscillator may remain enabled until the data or information packet has been received, processed, and any appropriate or desired response has been transmitted back to the source of the transmission, e.g., host 16.

In some embodiments, the oscillator is entirely disabled, e.g. its power consumption is reduced to substantially zero (neglecting leakage currents). In some embodiments, the oscillator may be partially disabled. For example, the oscillation may be halted but oscillator analog bias circuits may remain enabled to provide faster startup.

In some embodiments, the oscillator may remain fully enabled, but the oscillator output signal (e.g., clock) may be digitally gated to a logic high or a logic low state. Doing so reduces the power consumed by the USB logic circuitry that uses the clock signal, as power consumption in typical circuits (e.g., circuits using complementary metal oxide semiconductor, or CMOS devices) depends on the frequency of operation of such circuits.

By gating the oscillator output, such embodiments provide compatibility with high-quality factor (high-Q) oscillators, such as crystal oscillators (with relatively slow startup times), or with phase-locked-loop-based oscillators. In some embodiments, the oscillator output may be digitally gated as it is provided to one or more circuits, but be left operational (e.g., not gated) as it is provided to one or more other circuits. In other words, some circuits may stop receiving an active clock while other circuits continue to receive an active clock. This technique may be advantageous in embodiments in which it is desirable that some circuits receive a continuously running clock signal independent of the state of the communication bus.

Figure 5:
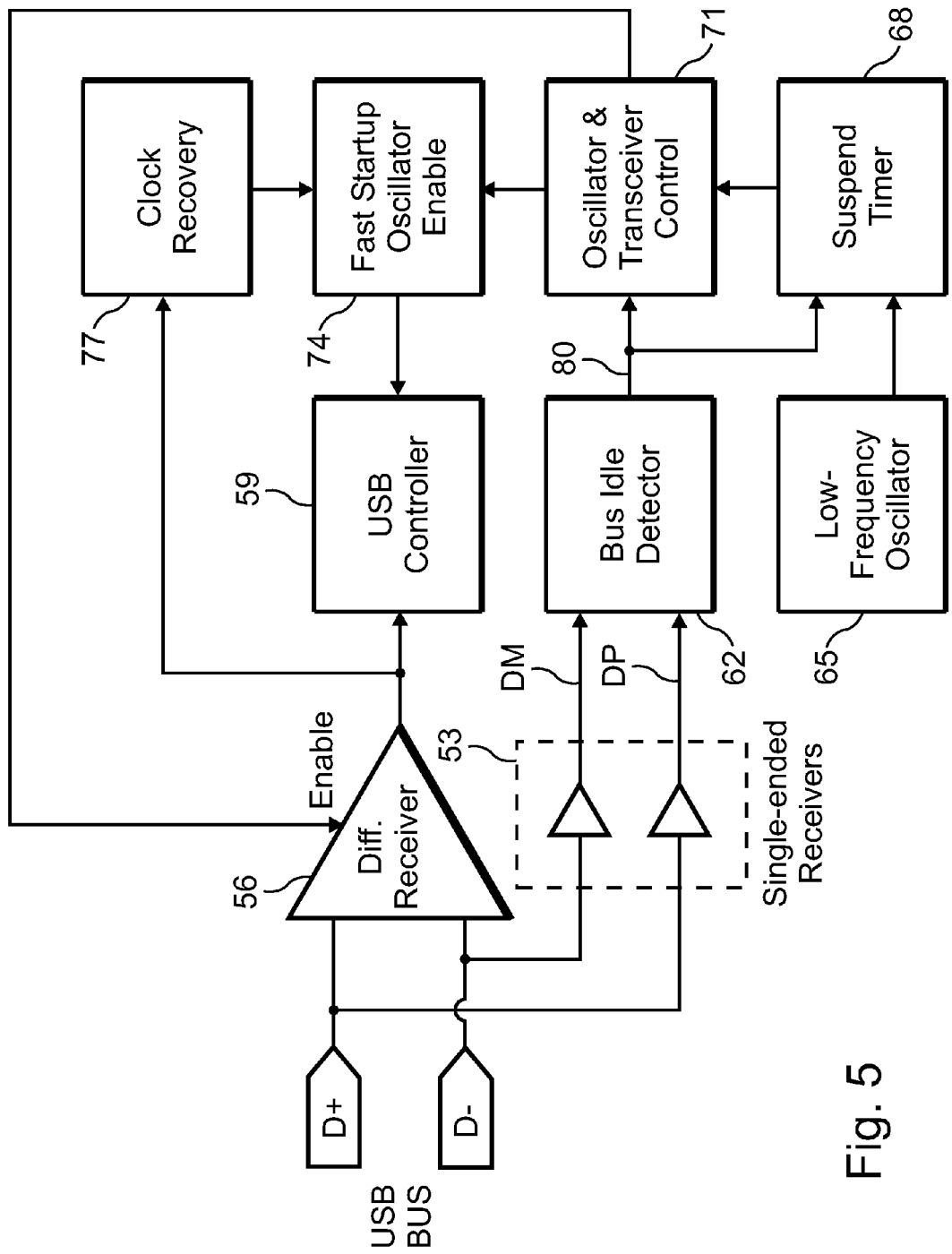
FIG. 5 illustrates a block diagram of a circuit arrangement for USB communication according to an exemplary embodiment.

FIG. 5 illustrates a block diagram of a circuit arrangement for USB communication according to an exemplary embodiment. A differential receiver (labeled "Diff. Receiver") 56 senses the differential state of the D+ and D− signals and generates a corresponding logic 1 or 0 (or logic high or low, respectively), which it provides to USB controller 59. The output of differential receiver 56 is generally sampled and processed by USB controller 59 to determine the received bits of the packet payload.

There are times during USB operation, however, when the transmitting device (e.g., a host, such as host 16 in FIGS. 1-3) pulls both the D+ and D− signals to a logic low level. For example, a USB host signals a reset condition by pulling both the D+ and D-signals to a logic low level. As a further example, a USB transmitter indicates the end of a packet by pulling both the D+ and D− signals to a logic low level, as illustrated in FIG. 4.

Since differential receiver 56 might not reliability indicate when both signals are at logic low levels (since the signals would be nearly equal, the output of differential receiver 56 might be indeterminate), the USB transceiver in FIG. 5 also includes a pair of single-ended receivers 53. Single-ended receivers 53 are used to detect such bus conditions, as described above.

In exemplary embodiments, single-ended receivers 53 can be used to detect the state of the USB signals, using logic circuitry in the bus idle detector circuit 62 in FIG. 5. For example, the following Verilog statement can be used to detect an idle state on the bus:

IDLE=SPEED?(DP & !DM):(!DP & DM);

where SPEED is at a logic high level for full-speed operation, and at a logic low level for low-speed operation and DP and DM are the outputs of the D+ and D− single-ended receivers 53, respectively.

In some embodiments, a single-ended receiver may be used to detect an idle state of the bus. For example, since the state where both D+ and D− are at a logic high level for a significant period of time is invalid for a USB interface, a single-ended receiver 53 detecting the state of the D+ signal may be adequate to detect an idle condition on a full-speed USB interface (by detecting when D+ is a logic high).

Similarly, for a low-speed USB interface, a single-ended receiver 53 detecting when D− is a logic high may be adequate to detect an idle condition. In some embodiments, a multiplexer may be used to selectively couple a single-ended receiver to either the D+ or D− signal, depending on whether the USB controller is operating in full-speed mode or in low-speed mode.

Using single-ended receivers 53 instead of using differential receiver 56 provides the advantage that oscillator 74 should generally be re-enabled by a USB reset signal. As discussed above, a USB reset signal might not be reliably detected by differential receiver 56.

Note, however, that in some embodiments, an alternative circuit arrangement may be used to detect the bus state, including a circuit dedicated to that purpose. For example, the logic generated by the Verilog statement above may be used to directly detect the bus state as long as the logic thresholds of the digital gates used for such detection are appropriate for the USB signaling levels.

Referring to FIG. 5, bus idle detector circuit 62 uses the outputs of single-ended receivers 53 to determine the state of the USB signals D+ and D−. When the bus state leaves the idle state (the bus is in a non-idle state), as illustrated in FIG. 4, bus idle detector circuit 62 uses output signal 80 to assert the enable control to oscillator 74 via oscillator and transceiver control circuit 71.

Oscillator 74 has relatively fast start-up times (compared, for example, to crystal oscillators). Oscillator 74 generates the clock signal used by logic circuits in USB controller 59 to process the incoming USB traffic. When USB controller 59 indicates that the incoming packet has been received, and optionally processed and/or responded to, oscillator and transceiver control circuit 71 can automatically de-assert the enable to oscillator 74.

In some embodiments, the condition under which oscillator 74 may be disabled by de-asserting its enable input may be detected by a circuit outside of USB controller 59. For example, a circuit that detects that the USB bus has been in an idle state for at least a minimum amount of time may trigger de-assertion of the enable signal provided to oscillator 74. As noted above, the USB bus generally occupies the J state when idle. According to the USB protocol, the USB bus should not remain in this J state for longer than about 6 bit periods, except when idle. A method commonly called bit-stuffing is specified by the USB protocol to prevent a long period of J (or K) signaling during packet transmission. This method allows a circuit to detect a true idle state of the bus by detecting when the bus has been in the J state for more than about 6 bit periods. In some embodiments, this circuit may use the outputs of single-ended receivers 53 to detect the idle, or J, state.

In exemplary embodiments, the de-assertion of the oscillator enable can occur immediately or after a programmable period during which the USB signals D+ and D-remain idle. For example, oscillator 74 can automatically be disabled anytime the USB signals remain idle beyond a programmed period of time, as measured, for example, by counting oscillator cycles.

In other embodiments, the oscillator may be disabled after transmission or detection of an EOP condition (described below). In some embodiments, the task of placing the oscillator back in its disabled state can be left to firmware running on a processor or other device, such as the MCU discussed above. For example, after the firmware has performed any processing necessary on a received packet, the firmware might set or clear a register bit (not shown) that disables oscillator 74.

Oscillator 74 can also be forced to remain enabled due to other system events. For example, a register bit (not shown) can be provided, which when set or cleared by firmware running in a processor or MCU, can force the oscillator to remain enabled independent of the state of the USB signals. Similarly, any pending interrupt from USB controller 59 to a processor or MCU can force oscillator 74 to remain enabled. This may be done to allow USB controller 59 to remain available to the processor or MCU for access of registers, payload first-in-first-out (FIFO) buffers, etc.

As specified by the USB specifications, a USB device should enter a suspend state when the bus remains in its idle state for at least 3 milliseconds. This arrangement allows a host to suspend a device by halting all traffic to that device (otherwise, the host is expected to send at least a Start-of-Frame packet every millisecond to a full-speed USB device).

In conventional USB interfaces, the 3-millisecond period is generally measured by counting cycles of the USB oscillator. In exemplary embodiments, however, oscillator 74 may be disabled when the bus is idle, as described above. In that situation, oscillator 74 would be unavailable for detecting the 3-millisecond period. To detect the 3-millisecond idle period, several alternatives may be used.

In some embodiments, a suspend timer circuit 68 is used. Suspend timer circuit may be clocked from an alternative, low-frequency (e.g., 32 kHz) clock source (not shown). The clock source is used to clock suspend timer circuit 68 to measure the length of idle periods on the bus (e.g., the timer automatically returns to 0 when the bus is non-idle, and increments when the bus is not in the idle state). When suspend timer circuit 68 reaches a value indicating approximately 3 milliseconds, oscillator 74 is re-enabled to allow USB controller 59 to process the suspend request.

The USB specification include a specified timing accuracy when transmitting packets onto the bus. For full-speed USB operation, the rate at which a device transmits bits is 12 megabits-per-second (MBPS), with an error of no more than plus or minus 0.25%. In typical USB controllers, this accuracy is achieved by the USB oscillator having the requisite accuracy. In some embodiments, this oscillator accuracy may be achieved by a crystal oscillator (or an internal oscillator frequency locked to a crystal-derived clock signal). In other embodiments, the accuracy may be achieved by incorporating a clock recovery circuit 77 that adjusts the frequency of an internal RC oscillator.

As noted above, U.S. Pat. No. 6,917,658 discloses a clock recovery method that allows a USB device to operate using an internal oscillator rather than a crystal oscillator (or an internal oscillator frequency locked to a crystal clock). Depending on the method chosen to provide the requisite accuracy, in some embodiments, oscillator 74 may be kept enabled when the bus is idle, but the oscillator output clock to USB controller 59 may be digitally gated, as described above. For example, in the case of the clock recovery method disclosed in U.S. Pat. No. 6,917,658, the oscillator may remain enabled to provide a continuous clock to clock recovery circuit 77.

Figure 6:
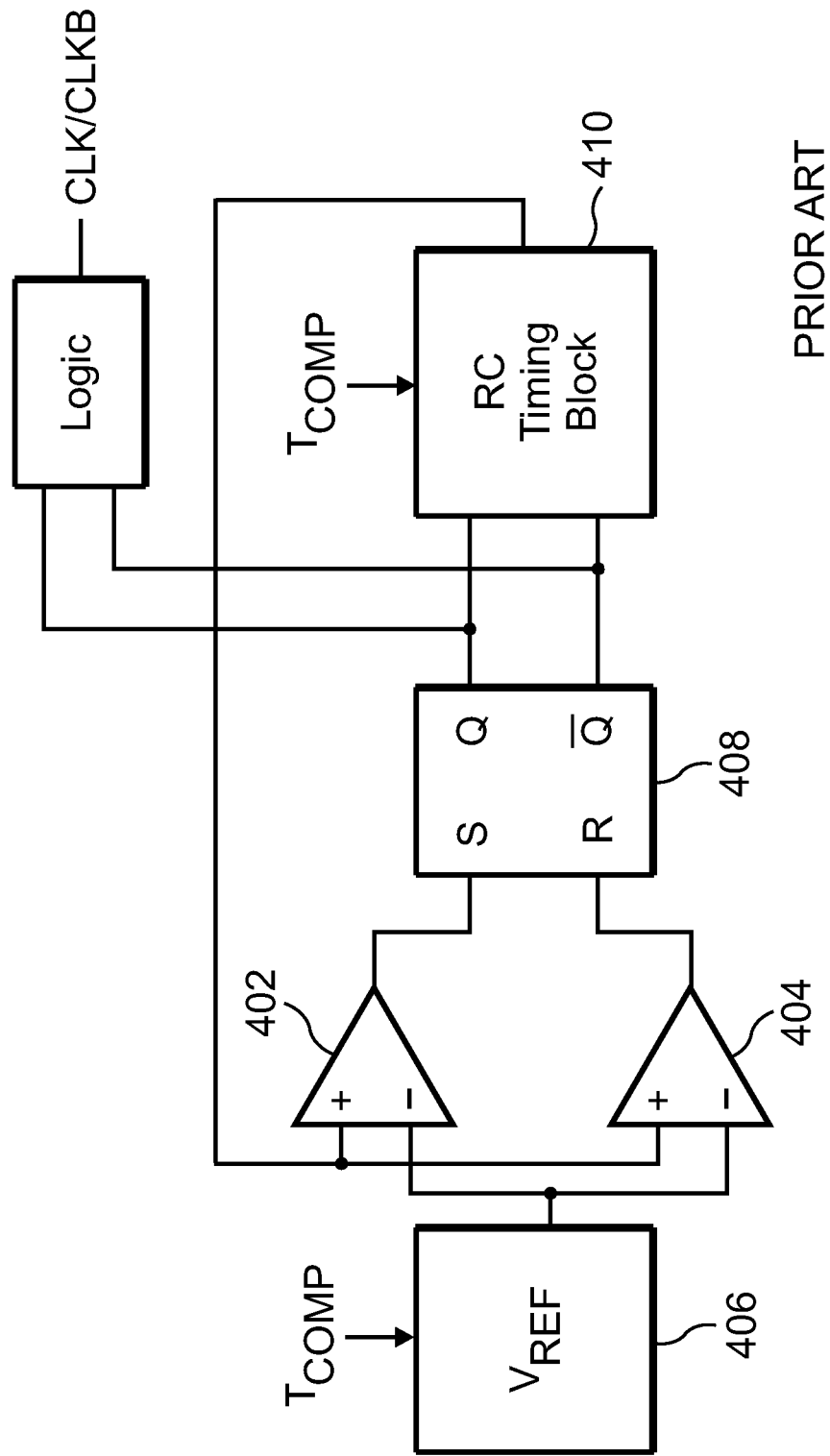
FIG. 6 depicts an exemplary conventional circuit arrangement for implementing oscillator 74.
Figure 7:
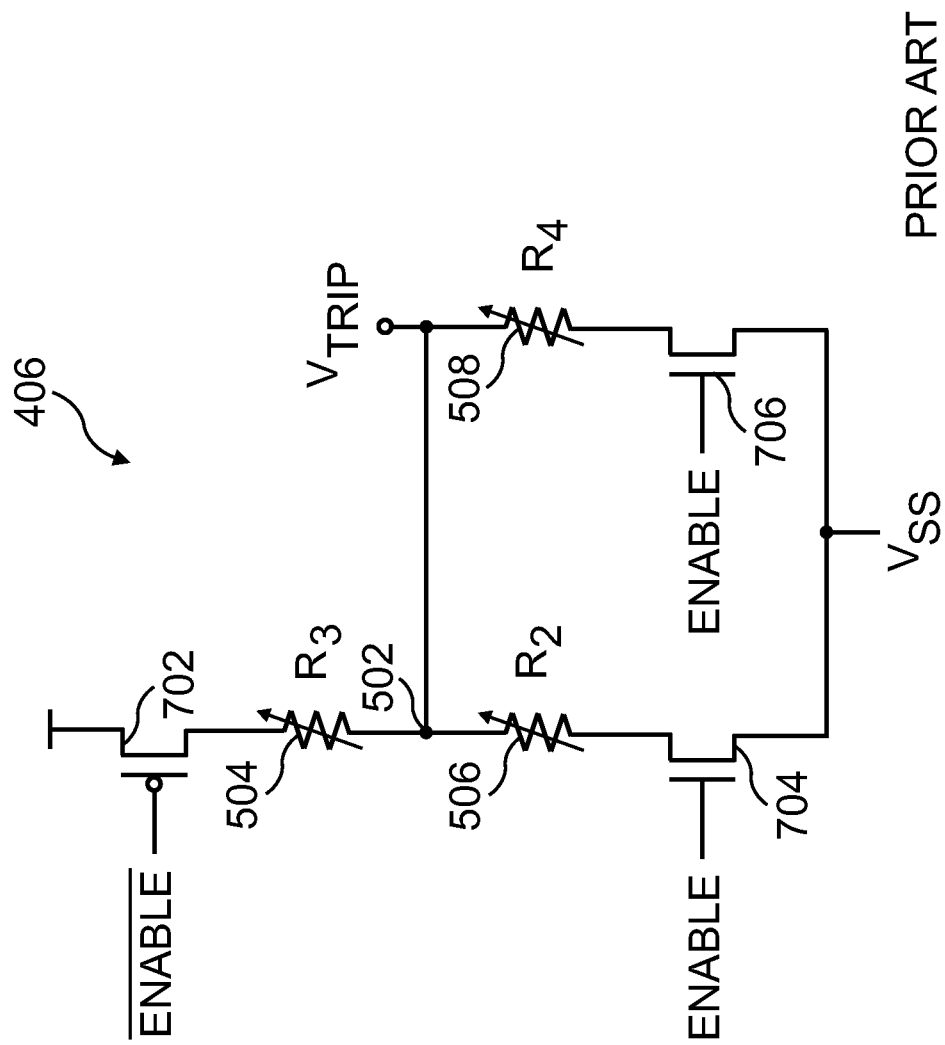
FIG. 7 illustrates a conventional circuit arrangement for disabling oscillator 74.

Oscillator 74 may be implemented in a variety of ways. As merely one example, the circuitry described in U.S. Pat. No. 7,395,447 might be used to implement oscillator 74 in exemplary embodiments. FIG. 6 depicts an exemplary circuit arrangement for implementing oscillator 74. In the oscillator shown in FIG. 6, $V_{REF}$ (406) and comparators (402 and 404) generally consume static power, whereas latch (408) and RC Timing Block (410) generally do not consume static power. In exemplary embodiments, it is beneficial to disable the oscillator components that consume static power. For example, $V_{REF}$ block (406) can be disabled as shown in FIG. 7 (described in U.S. Pat. No. 7,395,447).

Referring to the $V_{REF}$ block in FIG. 7, the enable control signal (ENABLE) from oscillator and transceiver control circuit 71 (see FIG. 5) activates the current paths though the resistor divider used to generate the VTRIP voltage. When the ENABLE signal has a logic low value, $V_{REF}$ block 406 is disabled, such that it consumes no (or little) static power. In some embodiments, however, it might be advantageous to leave $V_{REF}$ block 406 enabled during idle periods to provide for faster startup of oscillator 74 when an incoming USB packet is detected.

Figure 8:
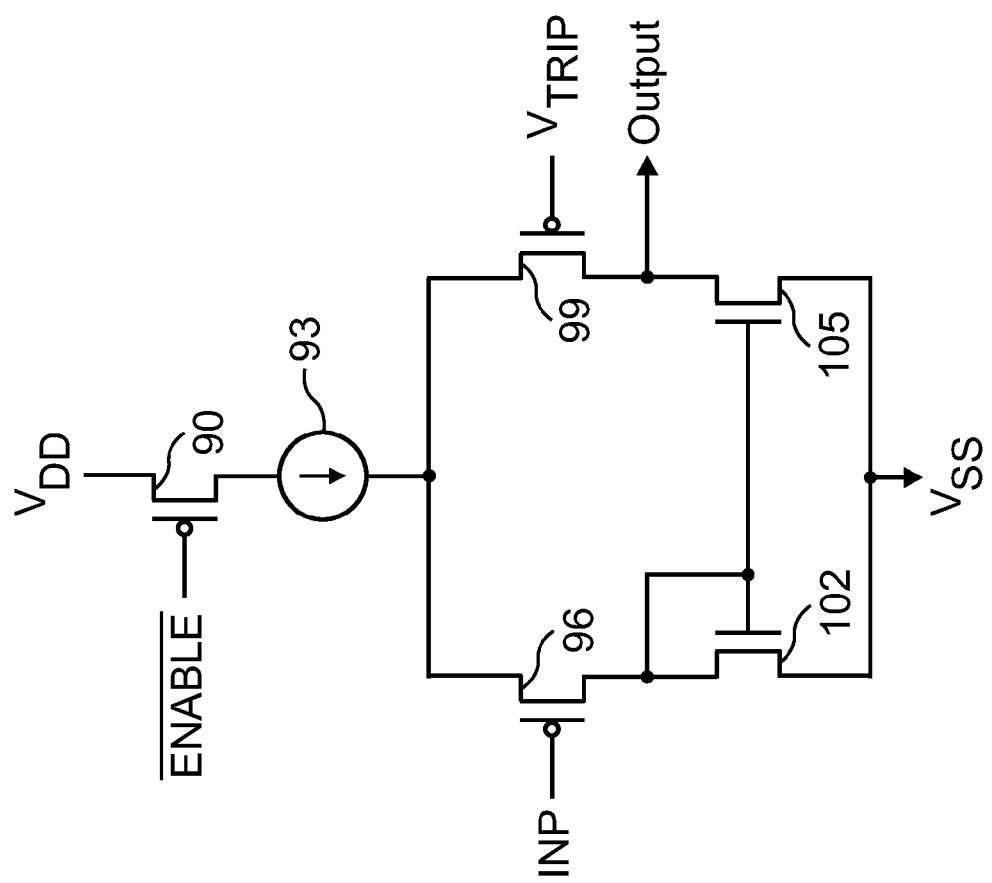
FIG. 8 shows a circuit arrangement for implementing a comparator for use in exemplary embodiments.

FIG. 6 depicts two comparators, 402 and 402, as part of the oscillator circuit. FIG. 8 shows a circuit arrangement for implementing the comparators in exemplary embodiments. The comparator receives its inputs via transistors 96 and 99. Transistors 102 and 105 constitute a current mirror. Current source 93 provides a bias current to transistors 96 and 99.

The complement of the enable signal for oscillator 74 (not shown) drives the gate of transistor 90. When the enable signal is in a logic high state (and its complement is therefore in a logic low state), transistor 90 turns on, and enables the comparator. Conversely, when the enable signal is in a logic low state (and its complement is therefore in a logic high state), transistor 90 turns off. In this scenario, the path from the supply voltage $V_{DD}$ to current source 93 is interrupted, which disables the comparator.

Note that the circuits shown in FIGS. 6-8 provide merely examples of implementing oscillator 74 and its associated components/circuits. A variety of alternatives exist for implementing oscillator 74 and its associated components/circuits, as noted above.

Another aspect of the disclosure relates to reducing power consumption of communication circuitry, such as USB devices or transceivers. This technique disables power-consuming parts of such circuitry (e.g., parts that consume relatively high amounts of power) when waiting for communication, for example, incoming USB packets or traffic (e.g., when the bus is idle).

For example, differential receiver 56 (see FIG. 5) generally consumes static power, for example, power consumption that is independent or nearly independent of what or whether traffic exists on the bus (static power consumption helps achieve the desired performance). However, in exemplary embodiments, single-ended receivers 53 are generally CMOS buffers, whose power consumption is effectively zero when the bus is idle.

Much like oscillator 74, differential receiver 56 is used during the second half of the synchronization pattern (to assist in sample alignment), and during reception of the packet payload and overhead traffic, such as cyclic redundancy check (CRC) fields, etc. As with oscillator 74, differential receiver 56 can be disabled during idle periods on the bus, and automatically re-enabled when the start of the synchronization pattern is detected.

As long as differential receiver 56 is operational by about the mid-point of the synchronization pattern, the incoming packet can be successfully received. In some embodiments, differential receiver 56 is enabled and disabled at the same approximate time instances as oscillator 74. In other embodiments, differential receiver 56 may be enabled and disabled at times different than when oscillator 74 is enabled and disabled.

In some embodiments, the outputs of single-ended receivers 53 may be used to achieve alignment with the synchronization pattern, allowing differential receiver 56 to remain disabled until near the end of the synchronization pattern. A comparator architecture similar to that shown in FIG. 8 can be used to disable differential receiver 56. Register configuration bits, discussed above, can also be provided to force the USB interface to keep the transceiver components and/or the oscillator components (see FIG. 5) enabled during idle periods.

In exemplary embodiments, power consumption of communication circuit 12 (e.g., a USB) is reduced by inhibiting the clock (e.g., USB clock) and/or parts of communication circuit 12, such as the USB differential transceiver, during incoming packets which will be rejected by the device. For example, in the case of USB devices, in some applications, the transmitting device (e.g., host 16) can provide data to the receiving device faster than the receiving device can process those data.

In a particular example, one USB application might transmit data from a host computer or device that will be transmitted across a universal asynchronous receiver transmitter (UART) bus by the receiving device. Since a USB bus can generally operate at a much higher bit-rate than a UART, incoming packets of data may be received faster than can be transmitted across the UART.

In such a case, the receiving device will generally reject incoming packets until room is made available in the device's packet first-in, first-out (FIFO) buffer by moving the data from a previous accepted packet in preparation for transmission using the UART. The device rejects the incoming packet by responding with a NAK packet transmitted back to the host. Depending on the relative bit rates of the USB and the UART, a relatively large fraction of the total device power consumption may be wasted in receiving data what will be rejected by the device, particularly since the USB host generally transmits the entire packet, including its data payload, before a NAK is returned by the device.

According to an aspect of the disclosed concepts, the clock signal(s) and/or differential transceiver of the receiving device, such as a USB device, are disabled during reception of some portion of to-be-rejected packets. The particular case of USB provides an example of this technique.

Each USB packet includes a SYNC field, a Packet ID (PID), an optional data payload with its CRC field, and an EOP condition. A receiving USB device generally decides that a packet will be rejected after receiving the PID, i.e. before the data payload arrives. This decision generally depends on whether the receiving device has sufficient space in its buffers to store the incoming packet at the time the PID is received.

In exemplary embodiments, the receiving device, e.g., communication circuit 12, can disable its clock signal(s) and/or transceiver circuitry shortly after receiving the PID of a rejected packet. Since the SYNC and PID occupy 16 bits compared to a much larger potential payload, this feature allows the receiving device to remain in a relatively low-power state for a majority of duration of the rejected-packet transmission.

Once the device decides to reject an incoming packet, it disables the USB clock and/or differential transceiver (e.g., differential receiver 56), as described above. However, unlike the features described above, where oscillator 74 is re-enabled by non-idle USB traffic, in some embodiments, the clock signal(s) and/or transceiver circuitry remain disabled until the end of the incoming rejected packet is detected.

One technique for detecting the end of the packet is to detect the USB EOP condition on the bus. As illustrated in FIG. 4, an EOP consists of an approximate two-bit period during which both the D+ and D− signals are pulled to a logic low state. Detection of the EOP causes the USB device to re-enable its clock signal(s) and/or differential transceiver (e.g., differential receiver 56) in order to transmit the NAK packet back to the host. Once the NAK packet is transmitted, the bus will generally be idle and the device may also enter its low-power state, as described above relating to idle periods on the bus.

When in its low-power state during incoming rejected packets, oscillator 74 and/or differential receiver 56 may also leave its low-power state if an unexpected state is detected on the bus. For example, if the EOP is lost due to communication errors, the device could otherwise fail to leave its low power state in time to transmit the NAK packet to the host.

To avoid such problems, the receiving device may also leave its low-power state when detecting, for example, a reset condition on the bus, or an idle bus period longer than a pre-determined period of time. For example, as discussed above, the receiving device may leave its low-power state if the J state is detected on the bus for more than approximately 6 bit periods, indicating a true bus idle state as opposed to a shorter duration of the J state that can occur during a normal packet transmission.

A reset condition also consists of a long period during which both the D+ and D− signals are pulled to a logic low state. Thus, in exemplary embodiments, the same circuit that detects an EOP can also be made to detect a reset condition.

Similarly, the same idle-detection methods described above (e.g., bus idle detector circuit 62) can be used to detect an idle period greater than, for example, 7 bit times. Since the USB clock is possibly disabled, this period can be qualified using an alternative clock source or an analog circuit for generating a discrimination pulse of the appropriate length of time. In some embodiments, this 7-bit idle period can be used to exit the low-power state, rather than using EOP detection.

Figure 9:
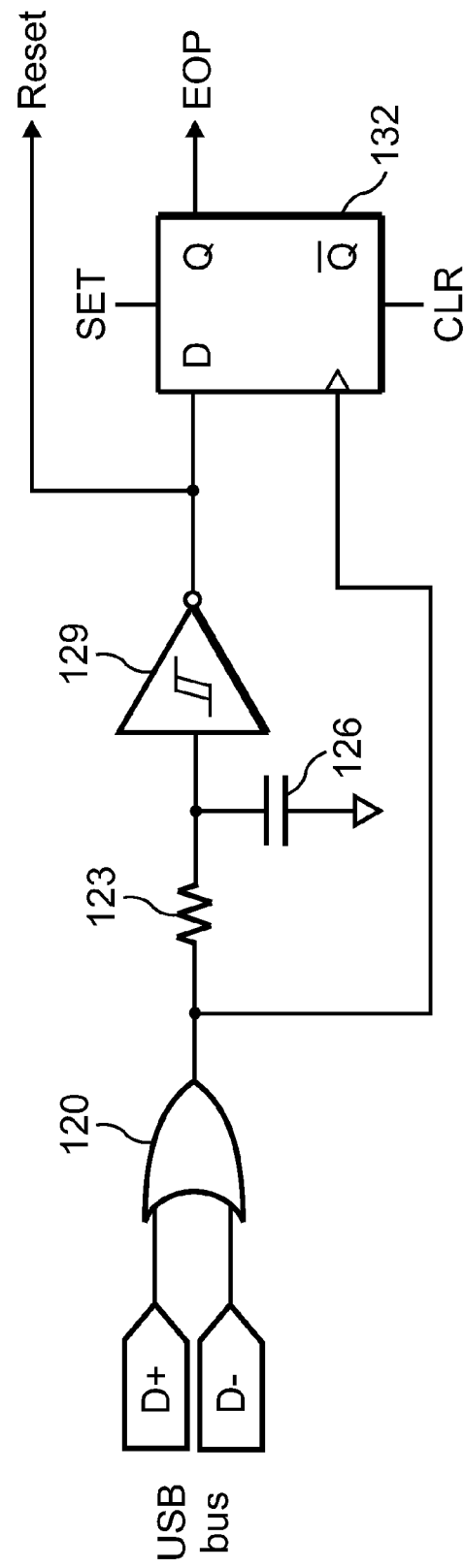
FIG. 9 illustrates a circuit arrangement for detecting an End-of-Packet (EOP) or reset condition according to an exemplary embodiment.

FIG. 9 illustrates a circuit arrangement for detecting an End-of-Packet (EOP) or reset condition according to an exemplary embodiment. When both the D+ and D− signals are driven to logic low levels, the output of OR gate 120 has a logic low value. Resistor 123 and capacitor 126 act as an RC combination or filter. After a period of time defined by the RC combination or filter, the input to the Schmitt inverter 129 goes to a logic low state, and its output goes to a logic high state.

At the end of the EOP period, D+ and/or D− go to a logic high state, causing the output of OR gate 120 to return to a logic high state. The transition at the output of OR gate 120 causes the clocking the output of the Schmitt inverter 129 into D flip-flop 132, indicating the end of a detected EOP. For detection of a reset condition, the output of the Schmitt inverter 129 can be used directly.

The RC combination or filter allows rejection of short periods during which D+ and D− appear at a logic low state, such as during a transition from a state D+=logic high, D−=logic low to a state where D+=logic low and D−=logic high. The value of the RC time constant may be set or designed depending on the bit times. For example, an RC time constant of approximately one-half of a bit time can reject such glitches, which might otherwise be erroneously interpreted as an EOP event.

Although some disclosed embodiments relate to low-speed and full-speed USB communications, persons of ordinary skill in the art will understand that other communication apparatus and methods, including high-speed USB, are contemplated within the scope of the disclosure. In particular, high-speed USB uses similar signaling nomenclature and protocols to communicate between devices. For example, high-speed USB uses J and K signaling states (which are defined as the state of transmitted currents into termination impedances, rather than transmitted voltages), and transmits packets starting with synchronization patterns.

Referring to the figures, persons of ordinary skill in the art will note that the various blocks shown might depict mainly the conceptual functions and signal flow. The actual circuit implementation might or might not contain separately identifiable hardware for the various functional blocks and might or might not use the particular circuitry shown. For example, one may combine the functionality of various blocks into one circuit block, as desired. Furthermore, one may realize the functionality of a single block in several circuit blocks, as desired. The choice of circuit implementation depends on various factors, such as particular design and performance specifications for a given implementation. Other modifications and alternative embodiments in addition to those described here will be apparent to persons of ordinary skill in the art. Accordingly, this description teaches those skilled in the art the manner of carrying out the disclosed concepts, and is to be construed as illustrative only.

The forms and embodiments shown and described should be taken as illustrative embodiments. Persons skilled in the art may make various changes in the shape, size and arrangement of parts without departing from the scope of the disclosed concepts in this document. For example, persons skilled in the art may substitute equivalent elements for the elements illustrated and described here. Moreover, persons skilled in the art may use certain features of the disclosed concepts independently of the use of other features, without departing from the scope of the disclosed concepts.

The invention claimed is:

1. A system for communicating information, the system comprising:
    a first device to communicate information via a communication link; and
    a second device to communicate information via the communication link, the second device comprising:
        a receiver to receive information from the communication link;
        a controller to process the received information; and
        an oscillator that provides at least one timing signal to the controller, wherein the oscillator is disabled when the communication link is in an idle state before the second device enters a suspend state.

2. The system according to claim 1, wherein the receiver is disabled when the communication link is in the idle state.

3. The system according to claim 2, wherein the receiver is disabled by interrupting at least one bias current in the receiver.

4. The system according to claim 1, wherein the receiver is disabled when the communication link communicates to-be-rejected information to the second device.

5. The system according to claim 4, wherein the receiver is disabled by interrupting at least one bias current in the receiver.

6. The system according to claim 1, wherein the oscillator is disabled when the communication link communicates to-be-rejected information to the second device.

7. The system according to claim 6, wherein the oscillator and receiver are enabled when an unexpected state of the communication is detected.

8. The system according to claim 7, wherein the unexpected state of the communication comprises: (a) a communication error; (b) a reset condition of the communication link; (c) the idle state of the communication link lasts longer than a pre-determined period of time.

9. The system according to claim 1, wherein the first device comprises a host.

10. The system according to claim 1, wherein the second device comprises a peripheral device.

11. The system according to claim 1, wherein the oscillator is partially disabled when the communication link is in the idle state.

12. The system according to claim 2, wherein the receiver is partially disabled when the communication link is in the idle state.

13. A communication system, comprising:
  a universal serial bus (USB) host to communicate information via a USB bus; and
  a USB device to communicate information via the USB bus, the USB device comprising:
    a differential receiver to receive packets from the USB bus;
    a USB controller to process the received packets, the USB controller coupled to receive a clock signal; and
    an oscillator coupled to provide the clock signal to the USB controller, wherein the oscillator is disabled when the USB bus is in an idle state before the USB device enters a suspend state.

14. The communication system according to claim 13, further comprising at least one single-ended receiver to detect states of the USB bus while the differential receiver is disabled.

15. The communication system according to claim 13, further comprising a detector to detect the idle state of the USB bus.

16. The communication system according to claim 13, further comprising a controller to: (a) disable the oscillator and/or differential receiver when the USB bus is in the idle state; and (b) enable the oscillator and/or differential receiver when the USB bus is in a non-idle state or in response to at least one state of the USB bus.

17. A method of operating a communication system, the method comprising:
  using a first device to communicate information via a communication link to a second device;
  receiving information from the communication link in the second device, and processing the information in response to a timing signal;
  enabling an oscillator to provide the timing signal when the communication link is in a non-idle state; and
  disabling the oscillator when the communication link is in an idle state before the second device enters a suspend state.

18. The method according to claim 17, wherein receiving information from the communication link in the second device comprises receiving information in a receiver, the method further comprising:
  disabling the receiver when the communication link is in the idle state; and
  enabling the receiver when the communication link is in a non-idle state.

19. The method according to claim 18, wherein disabling the receiver when the communication link is in the idle state further comprises interrupting a bias current in the receiver.

20. The method according to claim 17, wherein receiving information from the communication link in the second device comprises receiving information in a receiver, the method further comprising:
  disabling the receiver when the communication link is in the idle state; and
  enabling the receiver when an unexpected state of the communication is detected, wherein the unexpected state of the communication comprises: (a) a communication error; (b) a reset condition of the communication link; (c) the idle state of the communication link lasts longer than a pre-determined period of time.

* * * * *